June 21, 1966  P. DOTTER  3,256,964
COASTER HUB WITH MULTIPLE DISK BRAKE
Filed June 15, 1964
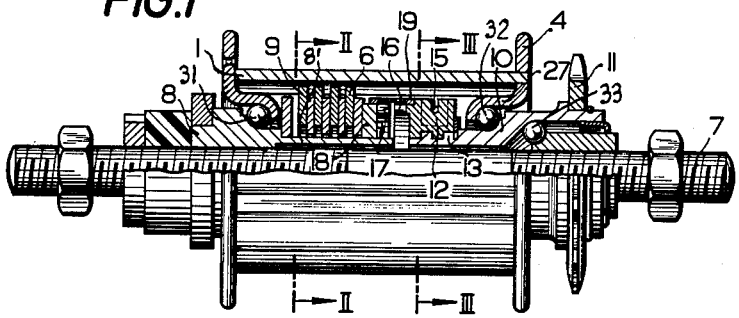
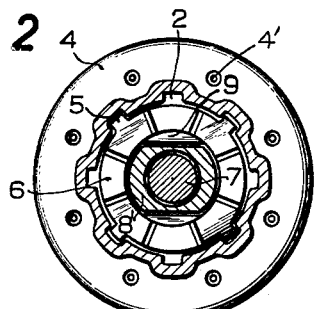
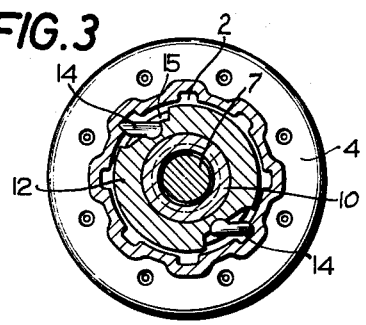
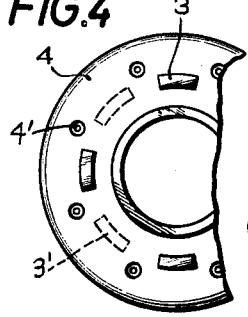
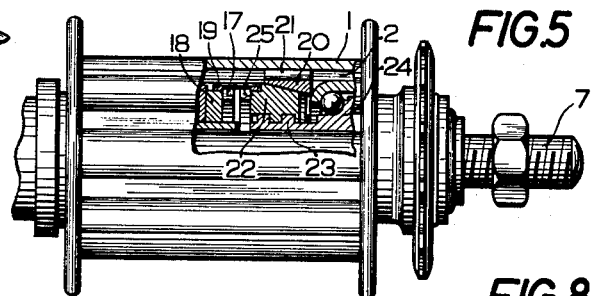
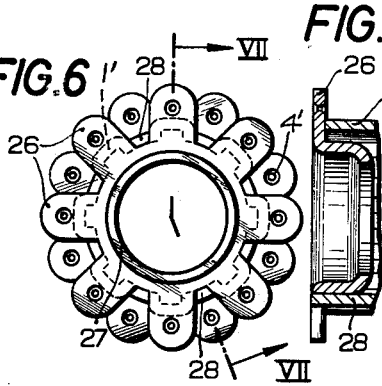
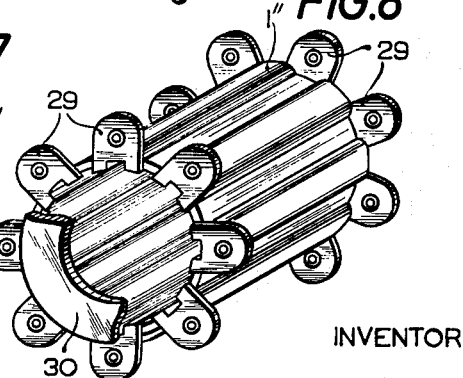
INVENTOR
Paul Dotter
By Richard Ernst
Ag't

United States Patent Office 3,256,964
Patented June 21, 1966

3,256,964
COASTER HUB WITH MULTIPLE DISK BRAKE
Paul Dotter, Schweinfurt (Main), Germany, assignor to Fichtel & Sachs A.G., Schweinfurt (Main), Germany, a corporation of Germany
Filed June 15, 1964, Ser. No. 375,172
Claims priority, application Germany, June 14, 1963, F 39,991
14 Claims. (Cl. 192—6)

This invention relates to coaster hubs for a bicycle or similar vehicle, and more particularly to a coaster hub equipped with a multiple-disk brake which is actuated by back-pedaling.

It is known to equip a bicycle hub with a set of stationary brake disks and a set of rotatable brake disks which are respectively mounted on the stationary shaft and on the shell of the hub. Each disk is secured against rotation on the corresponding supporting member, but is axially movable thereon. The stationary and rotatable disks are axially interleaved and the stack of disks so formed may be axially compressed for brake engagement and expanded for brake release.

The splined, keyed, or similar connections between disks and supporting hub elements which provide axial mobility of the disks without rotation create problems which are not readily solved within the limited space available in the hub shell of a bicycle hub, particularly, in view of the trend toward slimmer shells.

Because of the movable engagement between the disks and their supporting elements, heat transfer from the disks to outer surfaces of the hub is poor at best. The splines or keys must be capable of absorbing the very substantial forces which are effective during braking, and must be adequately dimensioned. A hub shell made heavier by splines or keys maintains an even higher temperature within the shell cavity than an otherwise similar, but lighter shell. The increased consumption of material in the construction of the shell increases the cost by an amount which is significant in this highly competitive industry.

It is the object of the invention to overcome the afore-described difficulties inherent in conventional coaster hubs equipped with multiple-disk brakes.

More specifically, it is an object of the invention to provide a coaster hub of the type described which is relatively light in weight, and inexpensive for this reason.

Another object is the provision of a hub shell which provides reliable strong engagement with the movable brake disks, yet is not only light in weight, but also capable of being manufactured at very low cost.

A further object of the invention is a coaster hub in which the heat generated during braking is effectively dissipated so that the working elements of the hub operate at relatively low temperature.

An additional object is the provision of a coaster hub which retains a relatively large store of available lubricant.

With these and other objects in view, the invention, in one of its aspects resides in a coaster hub whose outer envelope consists essentially of an extruded tube, which constitutes the hub shell, and of two annular bearing members fixedly fastened to respective axially terminal portions of the tube. The bearing members are respectively mounted on the stationary shaft of the hub and on a driver member which itself is rotatable on the shaft about the axis of the latter. The hub shell inherently has a uniform cross section over most of its length and is formed with axially elongated circumferentially spaced internal grooves.

A freewheeling coupling is interposed in the cavity of the hub shell between the same and the driver member. The aforementioned stationary brake disks are arranged on the shaft in the cavity of the hub shell, and the rotatable brake disks have respective portions which engage the internal grooves of the hub shell, and thus prevent relative angular movement of disks and shell.

A pressure member which may simultaneously function as an element of the afore-mentioned freewheeling coupling, is threadedly movable on the driver member about the hub axis toward and away from a position in which it compresses the stack of brake disks. A friction element is interposed between the pressure member and the shaft of the hub, directly or indirectly, to impede rotation of the pressure member with the driver member. The inclination of the threads which connect the driver member and the pressure member is such that the pressure member compresses the stack of brake disks when the driver member rotates in a backward direction, as during back-pedaling, and thereby frictionally engages the brake disks to prevent relative rotation of hub shell and shaft.

Other features and many of the attendant advantages of this invention will be readily appreciated as the same becomes better understood by reference to the following detailed description when considered in connection with the accompanying drawing in which:

FIG. 1 shows a coaster hub of the invention in side elevation, and partly in section in an axial plane;

FIG. 2 shows the hub of FIG. 1 in radial section on the line II—II;

FIG. 3 is another radially sectional view of the hub of FIG. 1 taken on the line III—III;

FIG. 4 shows elements of the hub of FIG. 1 in axial end view;

FIG. 5 illustrates a modified coaster hub of the invention in fragmentary side elevation view, portions of the hub being broken away to reveal internal parts in side elevational section;

FIG. 6 shows a modification of the device of FIG. 4 in a corresponding view;

FIG. 7 illustrates the structure of FIG. 6 in axial section on the line VII—VII; and FIG. 8 is a perspective view of a modified hub shell and of a portion of an associated bearing element.

Referring now to the drawing in detail, and initially to FIGS. 1 to 4, there is seen a hub shell 1 which is an elongated tube of uniform cross section and approximately uniform wall thickness. The wall of the tube is axially or longitudinally corrugated so that longitudinal grooves 2 within the hub shell cavity correspond to external ribs and vice versa. There are eight ribs and eight grooves in each shell surface, and they are uniformly spaced about the circumference of the hub shell 1.

End portions 3 of four external ribs project axially beyond the reminder of the hub shell 1, and end portions 3' of the other four ribs project in the opposite axial direction. The end portions 3 are angularly offset 90° from each other and the end portions 3' therefore are similarly offset from each other, and the two groups of end portions are angularly offset as is seen in FIG. 4.

Each group of end portions 3, 3' is received in conforming apertures of a flat annular disk 4 which thus forms a flange on an axial end of the tube 1. The end portions 3, 3' are fixedly fastened in the conforming apertures of the corresponding flanges by a shrink fit. Each flange 4 has a row of circumferential openings 4' in which wire spokes are normally received in the usual manner.

Four of the grooves 2 in the hub shell 1 are engaged by conforming radial projections 5 on each of several brake disks 6. The disks are therefore axially movable along the grooves 2, but they rotate with the hub shell 1 about the normally stationary shaft 7 of the hub on which the shell is mounted.

The central portion 27 of each flange 4 has the approximate shape of a cup whose bottom is centrally apertured. Each flange portion 27 provides the outer race for a hub-shell supporting ball bearing 31, 32. One end of the shaft 7 carries a fixedly attached bearing ring 8 which provides the inner race for the bearing 31. An integral tubular guide portion 8' of the bearing ring 8 extends inward of the hub shell cavity and carries several stationary brake disks 9. As best seen in FIG. 2, the guide portion 8' is of partly cylindrical shape, and partly flat. It is conformingly received in central openings of the stationary brake disks 9, whereby the disks may slide axially on the guide portion 8', but cannot rotate about the shaft 7.

The inner race of the other hub-shell supporting ball bearing 32 is provided by a tubular driver member 10 which itself is rotatably supported on the shaft 7 by a ball bearing 33. A sprocket 11 is fixedly attached to a portion of the driver member 10 outside the shell 1. The hub is normally operated by a non-illustrated chain trained over the sprocket 11.

An annular pawl carrier 12 is mounted on the driver member 10, and is connected to the same by square threads 13. Two pawls 14 are secured in peripheral recesses of the carrier 12 by an annular pawl spring 15 in a manner well known in itself. The spring urges the pawls into engagement with the grooves 2 in the hub shell 1. The pawls and grooves, as best seen in FIG. 2, thus constitute a freewheeling coupling which transmits power from the sprocket 11 to the hub shell 1 during forward rotation of the sprocket, that is, during normal pedaling of the bicycle. During backpedaling, the pawls ride idly along the corrugated inner wall of the hub shell.

Axially projecting claws 16 on the pawl carrier 12 are normally out of engagement with corresponding claws 17 on an annular end plate 18 of the stack of brake disks. The plate 18 has a central aperture which conforms to the shape of the guide portion 8', and is therefore axially movable, but not rotatable on the latter. A short tube 19 of friction facing material is attached on the pawl carrier 12 and extends far enough toward the brake disks 6, 9 to engage the outer cylindrical face of the end plate 18 in all operative positions of the hub elements. Since the end plate 18 cannot move angularly with respect to the axis of the shaft 7, the frictional engagement of the tube 19 with the plate 18 hampers the rotation of the pawl member.

The inclination of the threads 13 is such, that the pawl carrier 12 tends to move into the position shown in FIG. 1 during forward rotation of the driver member 10, and that it is threadedly moved from the illustrated position toward the brake disks 6, 9 during back-pedaling. During back-pedaling, the claws 16, 17 are quickly engaged and prevent rotation of the pawl carrier 12 relative to the shaft 7, while not interfering with axial pawl carrier movement. Upon further back-pedaling, the pawl carrier 12 abuttingly engages the end plate 18 and compresses the stack of disks 6, 9, thereby retarding and ultimately arresting movement of the hub shell 1 about the shaft 7.

The embodiment of the invention illustrated in FIG. 5 is provided with a freewheeling coupling different from the pawl coupling described hereinabove. The output member 20 of the coupling shown in FIG. 5 is a short tube whose outer wall has ribs 21 conformingly received in the grooves 2 of the hub shell, and which is thereby secured against rotation. The inner wall of the member 20 flares conically toward the end plate 18. In the driving position of the coupling seen in FIG. 5, the member 20 is engaged by the conical input member 20 of the coupling which is secured by square threads 23 on the driver member 24 of the hub. Claws 25 and a tube 19 of friction facing material attached to the conical member 20 provide cooperation with a stack of brake disks in a manner evident from the description of FIGS. 1 to 4.

As seen in FIGS. 6 and 7, the flanges 4 which hold the wire spokes to the hub may be partly cut away to reduce the weight and apparent bulk of the hub so that each central portion 27 carries eight radially projecting lugs 26 each having an opening 4'. One of the spoke retaining rings formed in this manner is held to one end of a hub shell 1' by integral axial projections 28 on each of the eight inner ribs of the hub shell 1', which are firmly wedged between the projections, whereas the other spoke retaining ring is held by corresponding projections of the outer ribs in a manner not shown, but readily evident from FIG. 6.

In yet another modification of the spoke retaining arrangement illustrated in FIG. 8, eight radial lugs 29 on one end of a shell 1" are integral with the outer ribs of the shell whereas the eight lugs 29' on the other shell end integrally extend from the inner ribs. An outer bearing ring 30, similar in configuration to the central portion 27 of the flange 4, provides an outer ball bearing race. The bearing ring 30 is retained in the end of the shell 1" by friction. It covers the axial ends of the grooves 2 and provides a lubricant-tight seal with the shell about the shaft 7.

While a corrugated shape is preferred for the hub shell of the invention, other extruded shapes will readily suggest themselves for the same purpose. The cross section of the shell 1 may thus be of any non-cylindrical shape which prevents the rotation of comformingly shaped rotatable brake disks.

The corrugated shape illustrated has the advantage of a particularly large outer surface which favors heat exchange with the surrounding air. Heat exchange is further enhanced because the ribbed outer wall creates turbulence in the air about the hub. The uniform and relatively small wall thickness is also conducive to rapid dissipation of heat from the hub shell cavity.

Not all internal grooves 2 are engaged by the radial projections 5 of the rotatable brake disks 6. Those grooves 2 which are free from engagement with the brake disks serve as reservoirs in which lubricant is stored, and from which it is gradually released.

It should be understood, of course, that the foregoing disclosure relates to only a preferred embodiment of the invention, and that it is intended to cover all changes and modifications of the examples of the invention herein chosen for the purpose of the disclosure which do not constitute departures from the spirit and scope of the invention set forth in the appended claims.

What is claimed is:
1. A coaster hub comprising, in combination:
 (a) a normally stationary shaft having an axis;
 (b) a tubular driver member rotatable on said shaft about said aixs in a forward direction and in a backward direction;
 (c) two annular bearing members respectively mounted on said shaft and on said driver member for rotation about said axis in axially spaced relationship;
 (d) a hub shell having a uniform cross section transverse of said axis over most of the axial length thereof, said hub shell defining a cavity therein;
 (e) fastening means fixedly fastening respective axially terminal portions of said hub shell to said bearing members,
  (1) said hub shell being formed with a plurality of axially elongated circumferentially spaced ribs on the outer face thereof and with a plurality of axially elongated circumferentially spaced grooves on an inner face thereof in said cavity, said grooves being radially aligned with said ribs and defining therebetween ribs on said inner face;
 (f) freewheeling coupling means interposed in said cavity between said driver member and said hub shell;
 (g) a plurality of stationary brake disks axially juxtaposed on said shaft in said cavity, said disks being axially movable on said shaft and secured against rotation relative thereto;

(h) a plurality of rotatable brake disks axially movable on said hub shell, respective portions of said rotatable brake disks engaging said grooves for securing said rotatable brake disks against angular movement relative to said hub shell, each rotatable brake disk being axially interposed between two stationary brake disks, (1) said stationary brake disks and said rotatable brake disks being members of a stack of cooperating brake disks;

(i) a pressure member threadedly movable on said driver member about said axis toward and away from an operative position in which said pressure member axially compresses said stack for braking engagement of said stationary disks with said rotatable disks; and (j) friction means interposed between said pressure member and said shaft for impeding rotation of said pressure member and for thereby moving said pressure member axially toward said operative position thereof when said driver member rotates in said backward direction, and for moving said pressure member axially away from said operative position thereof when said driver member rotates in said forward direction.

2. A hub as set forth in claim 1, wherein said shell has a circumferential wall of substantially uniform thickness.

3. A hub as set forth in claim 2, said bearing members each being formed with a plurality of recesses therein, said fastening means including a plurality of integral axial projections on respective ones of said ribs, said projections engaging respective recesses in said bearing members.

4. A hub as set forth in claim 1, wherein said grooves are substantially uniformly spaced about said axis.

5. A hub as set forth in claim 1, further comprising spoke retaining means on one of said bearing members.

6. A hub as set forth in claim 1, further comprising a spoke-retaining flange integral with one of said bearing members, a portion of said flange projecting radially outward beyond said hub shell, said projecting portion being formed with a plurality of circumferentially spaced openings for receiving respective wire spokes.

7. A hub as set forth in claim 1, further comprising a plurality of spoke-retaining lugs integral with one of said bearing members and projecting radially outward beyond said hub shell, each lug being formed with an opening for receiving a wire spoke, said lugs being circumferentially spaced about said axis.

8. A hub as set forth in claim 1, respective axially terminal portions of said ribs engaging said bearing members and constituting said fastening means.

9. A hub as set forth in claim 8, wherein said terminal portions frictionally engage said bearing members.

10. A hub as set forth in claim 1, further comprising two ball bearings interposed between said hub shell and said shaft, said bearing members constituting the respective outer races of said bearings.

11. A hub as set forth in claim 1, wherein said freewheeling coupling means include a pawl mounted on said pressure member for movement toward and away from a position in which said pawl engages one of said grooves for selectively transmitting movement to said hub shell when said driver member rotates in said forward direction, and resilient means urging said pawl toward said position thereof.

12. A hub as set forth in claim 1, wherein said freewheeling coupling means include an output portion on said hub shell and an input portion on said pressure member, the portions of said coupling means having conformingly engageable faces of circular cross section about said axis, said faces axially tapering in a common direction.

13. A hub as set forth in claim 12, wherein said faces are substantially conical.

14. A hub as set forth in claim 1, further comprising cooperating coupling means on said pressure member and on said shaft engageable for preventing rotation of said pressure member about said shaft, said cooperating coupling means being engaged by movement of said pressure member toward said operative position.

References Cited by the Examiner

UNITED STATES PATENTS

| 1,411,382 | 4/1922 | Rupe | 301—105 |
| 2,091,586 | 8/1937 | Glacy | 192—6 |
| 2,215,970 | 9/1940 | McGrath et al. | 192—6 |
| 2,997,145 | 8/1961 | Ross | 192—6 |

FOREIGN PATENTS 417,399  5/1910  France.

DAVID J. WILLIAMOWSKY, *Primary Examiner.*